(12) United States Patent
Olfat

(10) Patent No.: US 7,843,870 B2
(45) Date of Patent: Nov. 30, 2010

(54) SYSTEMS AND METHODS OF SUPPORTING MULTIPLE WIRELESS COMMUNICATION TECHNOLOGIES

(75) Inventor: Masoud Olfat, Clarksville, MD (US)

(73) Assignee: Clear Wireless LLC, Kirkland, WA (US)

( * ) Notice: Subject to any disclaimer, the term of this patent is extended or adjusted under 35 U.S.C. 154(b) by 881 days.

(21) Appl. No.: 11/593,476

(22) Filed: Nov. 7, 2006

(65) Prior Publication Data

US 2008/0107047 A1 May 8, 2008

(51) Int. Cl.
*H04W 4/00* (2009.01)
(52) U.S. Cl. .................. 370/328; 370/455; 370/464
(58) Field of Classification Search .................. 370/464
See application file for complete search history.

(56) References Cited

U.S. PATENT DOCUMENTS 5,732,076 A * 3/1998 Ketseoglou et al. ......... 370/347

2006/0187876 A1 * 8/2006 Schmidl et al. ............. 370/328

OTHER PUBLICATIONS

International Search Report and Written Opinion for PCT/US07/23135 dated Feb. 20, 2008.

* cited by examiner

*Primary Examiner*—Rafael Pérez-Gutiérrez
*Assistant Examiner*—Nimesh Patel
(74) *Attorney, Agent, or Firm*—Crowell & Moring LLP

(57) ABSTRACT

Systems and methods for supporting multiple wireless communications technologies are provided. When a first and second base station operate according to different wireless communication technologies on the same carrier frequency in different cells or on different carrier frequencies in the same cell the frame structure of each base station is controlled in such a way that idle periods of transmissions from one base station are aligned with idle periods of the other base station. When the first and second base stations are located in the same cell and operate on the same carrier frequency the frames of the first and second base stations are time-interlaced.

12 Claims, 8 Drawing Sheets

SYSTEMS AND METHODS OF SUPPORTING MULTIPLE WIRELESS COMMUNICATION TECHNOLOGIES

BACKGROUND OF THE INVENTION

There are a number of different wireless communication technologies currently deployed by wireless network operators. These technologies include analog and digital time division multiple access (TDMA), which is commonly referred to as advanced mobile phone system (AMPS), Global System for Mobile Communications (GSM), code division multiple access (CDMA), and the like. These types of systems are commonly referred to as second generation (2G) wireless communication technologies. Wireless network operators have made large investments into infrastructure equipment to support particular wireless communication technologies.

Numerous standards have been developed for third generation (3G) wireless communication technology, and there is currently much development for fourth generation (4G) wireless communication technology. Third and fourth generation wireless communication technologies are designed to provide greater efficiency and data capacity than second generation networks. Wireless network operators see deployment of third and fourth generation systems as a way to increase revenue by providing a greater variety of services, and in particular data-intensive services.

Although wireless network providers desire to deploy third and/or fourth generation networks, they must be particularly careful in the selection of a particular technology due to the large infrastructure investments required. Accordingly, wireless network operators are very hesitant to move to a new technology for fear of investing in one that is surpassed in capacity and data capacity by newer technologies.

Having a convergent unified broadband wireless technology in the future will prevent the fragmentation of wireless mobility market between several technologies. This is beneficial to wireless network operators by creating larger economies of scale, to vendors by creating a larger market for their products, and to end-users by reducing the cost of equipment and services. However, at some point in time multiple technologies may co-exist on the same network. Due to the heterogeneity in the wireless access technologies, allowing existing and future generation mobile technologies to co-exist on the same networks will become a critical challenge.

SUMMARY OF THE INVENTION

To address wireless network operator's concerns about being locked into a particular wireless communication technology the present invention provides systems and methods for supporting multiple wireless communication technologies. By supporting multiple wireless communication technologies, a wireless network operator can invest in infrastructure of one wireless communication technology and continue to operate that infrastructure while deploying another wireless communication technology. Exemplary embodiments of the present invention provide cross-layer protocol optimization and signaling protocols for efficient network resource utilization when WiMAX and 3G LTE technologies coexist on the same network.

In accordance with exemplary embodiments of the present invention, two different time division duplex (TDD) wireless communication technologies, e.g., WiMAX and 3G LTE, are supported within the same wireless communication network. These wireless communication technologies can operate on two adjacent carrier frequencies in the same cell, on the same carrier frequency in adjacent cells and/or on the same carrier frequency in the same cell.

In the case of the wireless communication technologies being supported on two adjacent carriers in the same cell or the same carrier of adjacent cells, the TDD time frames of the two access technologies are aligned in such a way that the downlink transmissions of one technology do not collide with the uplink transmissions of the other technology and vice versa, while preserving frame efficiency. This is achieved by efficiently overlapping the idle period. The idle period is the time gap between the downlink and uplink portion of a frame (or vice versa) that is required for the base station and mobile stations to switch from transmission mode to reception mode (or vice versa). For the case of technologies being supported on the same carrier in the same cell, the two technologies are time-interlaced, and signaling protocols are employed to allow this interlacing. The time-interlacing can be achieved using sleep modes or other techniques allowing unavailability intervals of the two wireless communication technologies.

Other objects, advantages and novel features of the present invention will become apparent from the following detailed description of the invention when considered in conjunction with the accompanying drawings.

BRIEF DESCRIPTION OF THE DRAWING FIGURES

Figure 7:
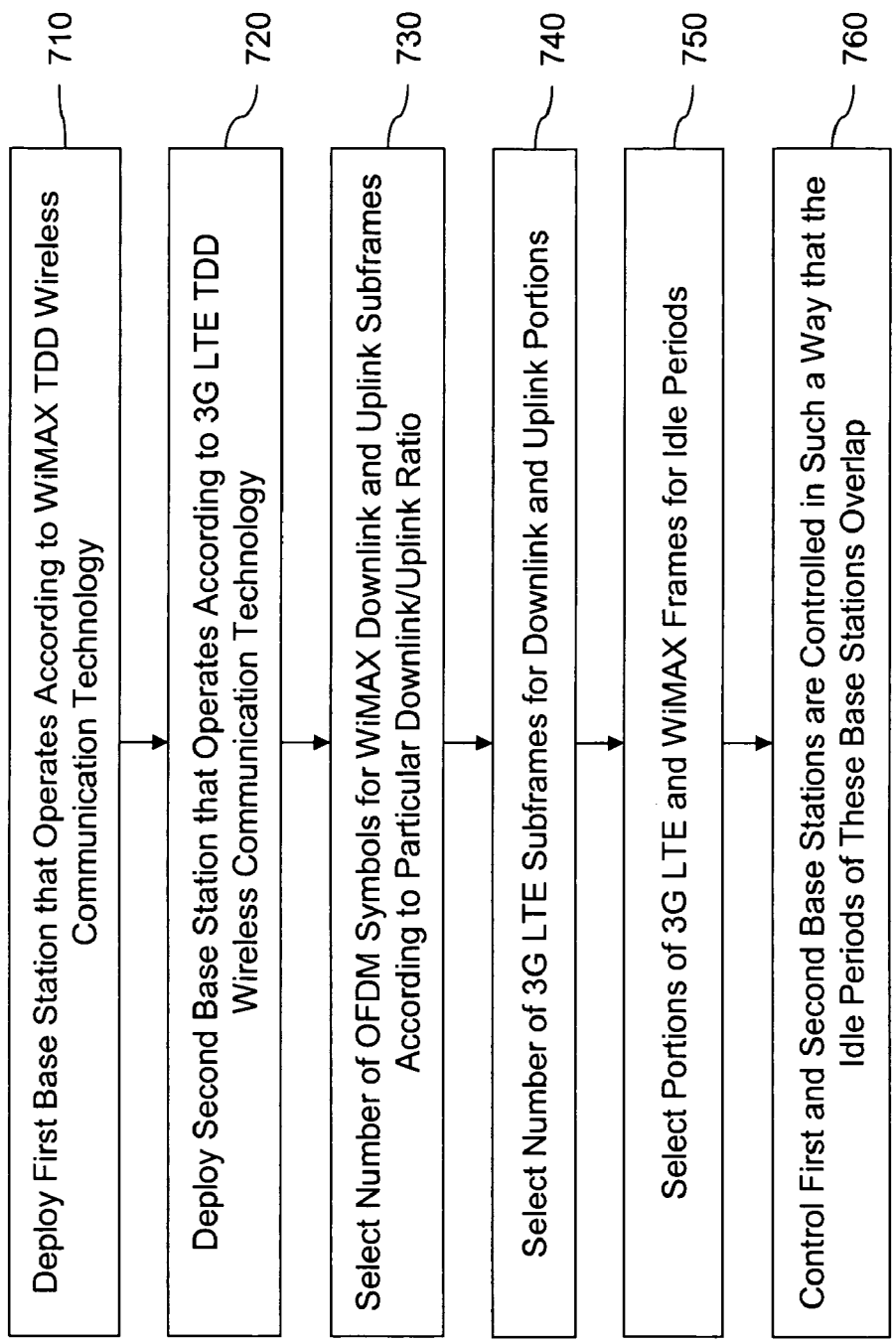
Figure 8:
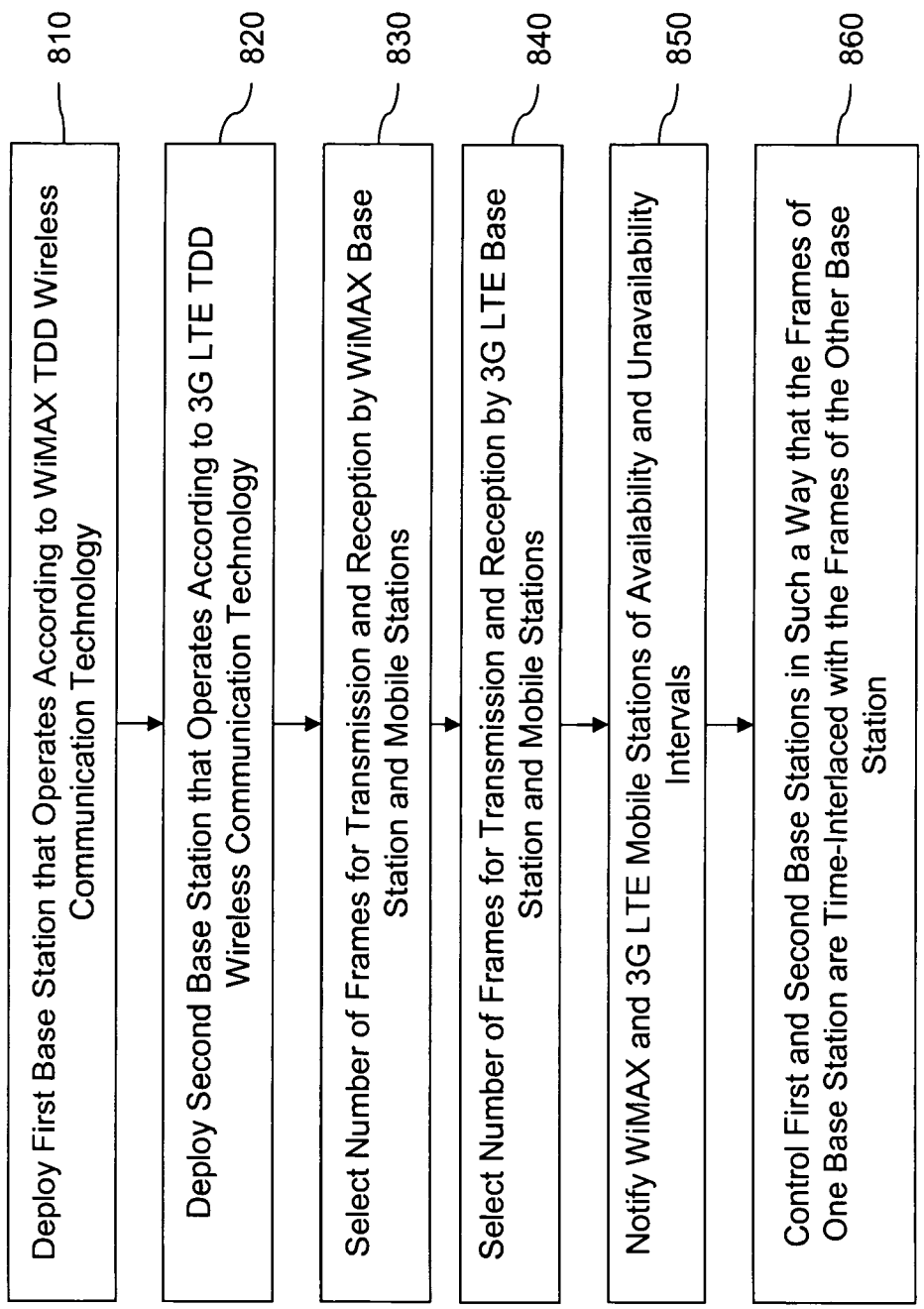

FIG. 7 illustrates an exemplary method for supporting multiple wireless communication technologies operating in the same cell on different carrier frequencies or in different cells on the same carrier frequency in accordance with the present invention; and FIG. 8 illustrates an exemplary method for supporting multiple wireless communication technologies operating in the same cell on the same carrier frequency in accordance with the present invention.

DETAILED DESCRIPTION OF THE PREFERRED EMBODIMENTS

In the following the present invention is described in connection with WiMAX (defined by the 802.16 standard) and 3G LTE (defined by the $3^{rd}$ Generation Partnership Project (3GPP)) technologies, both of which employ orthogonal frequency division multiplexing (OFDM) with a time division duplex (TDD) duplexing mode.

WiMAX is emerging as an OFDM-based technology solution to provide some of the 4G requirements. WiMAX can be implemented in a TDD mode, and can be supported in a number of different frequency bands, such as the 2.5 GHz frequency band.

The 3G LTE standard is currently being developed, and will provide a TDD mode of operation. 3G LTE will likely become the dominant access technology for many European wireless networks, and it is also likely to be deployed in other areas throughout the world. However, 3G LTE technology is in the early phase of standard development and products based on the standard may not be produced for several years. It is anticipated that some wireless network operators will soon deploy WiMAX technology and at a later time would like to deploy 3G LTE technology in the same network in such a way that these two technologies will be operating simultaneously. It should be recognized that although the 3G LTE standard is still being developed, aspects of the standard relevant to the present invention (i.e., operation in a TDD mode) have been agreed upon.

Exemplary embodiments of the present invention are discussed in connection with WiMAX and 3G LTE when they are working in TDD mode. However, without a significant modification, the present invention can be applied to downlink and uplink frames of the two technologies separately when they are deployed in a frequency division duplex (FDD) mode.

In accordance with exemplary embodiments of the present invention, the co-existence of WiMAX and 3G LTE deployed in a TDD mode of operation can involve deployment of the two technologies in one or more of the following three scenarios: (1) in the same cell on two adjacent carrier frequencies; (2) in the adjacent cells on the same carrier frequency (e.g., using frequency reuse of 1); and (3) in the same cell on and on the same carrier frequency.

In accordance with the present invention, in the first and second deployment scenarios the TDD frames of the two access technologies are aligned in such a way that the downlink of one technology does not collide with the uplink of the other technology and vice versa. This alignment addresses the problem of high interference caused by the downlink high power transmissions with the low power uplink transmission of the other base station. In accordance with the third scenario, the present invention consolidates both access technologies in such a way that frames of the two technologies are time-interlaced.

In order to appreciate aspects of the present invention, an overview of WiMAX and 3G LTE frame structures is presented below.

Figure 1:
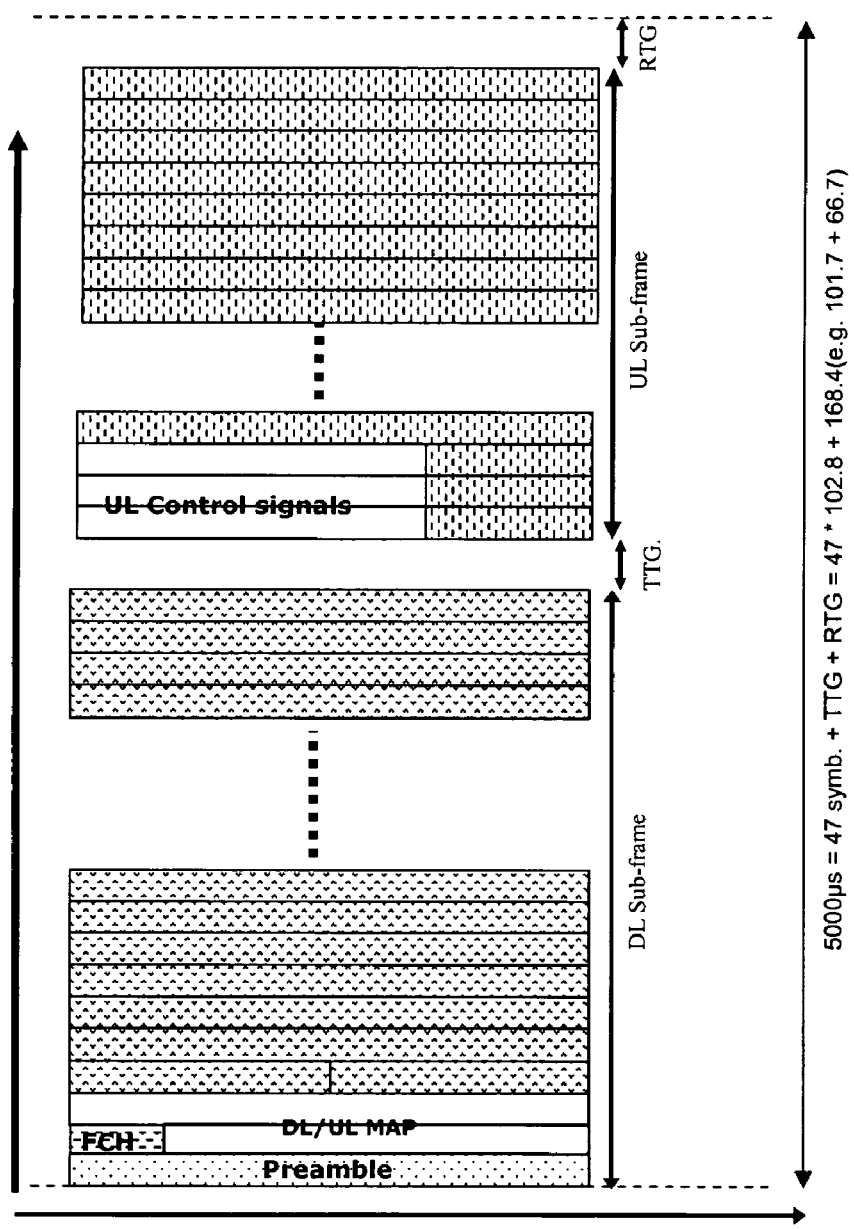
FIG. 1 illustrates an exemplary OFDM time division duplex (TDD) frame formatted according to the WiMAX standard.

FIG. 1 illustrates an exemplary OFDM time division duplex (TDD) frame formatted according to the WiMAX standard. Each frame is divided into downlink (DL) and uplink (UL) subframes separated by Transmit/Receive and Receive/Transmit Transition Gaps (TTG and RTG, respectively) to prevent collisions between downlink and uplink transmissions. The control information used in each frame for optimal system operation are a preamble for synchronization and coarse channel estimation, Frame Control Header (FCH) to provide frame configuration information, DL/UL MAP to provide sub-channel allocation and other control information, and uplink control symbols to allow uplink ranging, uplink CQICH, and uplink acknowledgement.

Each 5 ms frame includes 47 symbols, each having a 102.8 µs duration. The 47 symbols are divided between downlink and uplink subframes according to a particular DL/UL ratio, which can be adjusted by a wireless network operator. The sum of TTG and RTG is 168 µs. When only one permutation is used in the uplink subframe (i.e., either adaptive modulation and coding (AMC) or partial usage of subchannels (PUSC)), the number of symbols in WiMAX's uplink subframe must be a multiple of 3. In the case of a AMC 3×2 permutation, this requirement is relaxed.

Figure 2:
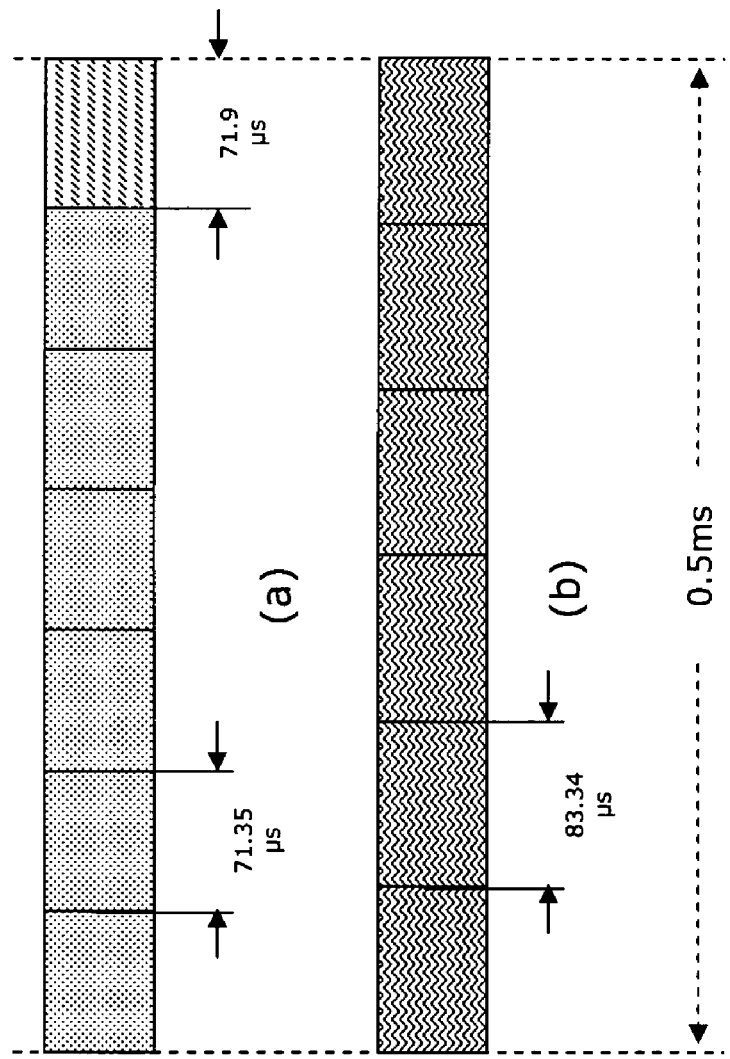
FIG. 2 illustrates two exemplary TDD downlink subframes formatted according to the 3G Long Term Evolution (LTE) standard.

FIG. 2 illustrates two exemplary TDD downlink subframes formatted according to the 3G LTE standard. A 3G LTE frame is composed of several 0.5 ms subframes, which can have one of two different formats. In the first format, illustrated as the top subframe in FIG. 2, the subframe includes 7 short symbols, with a longer cyclic prefix (CP). In the second format, illustrated as the lower subframe in FIG. 2, the subframe includes 6 long symbols. In both subframe formats, one or two last symbols in the last subframe of the downlink portion are considered as Idle Period (IP), which provides a similar function to the TTG of the WiMAX frames.

Figure 3:
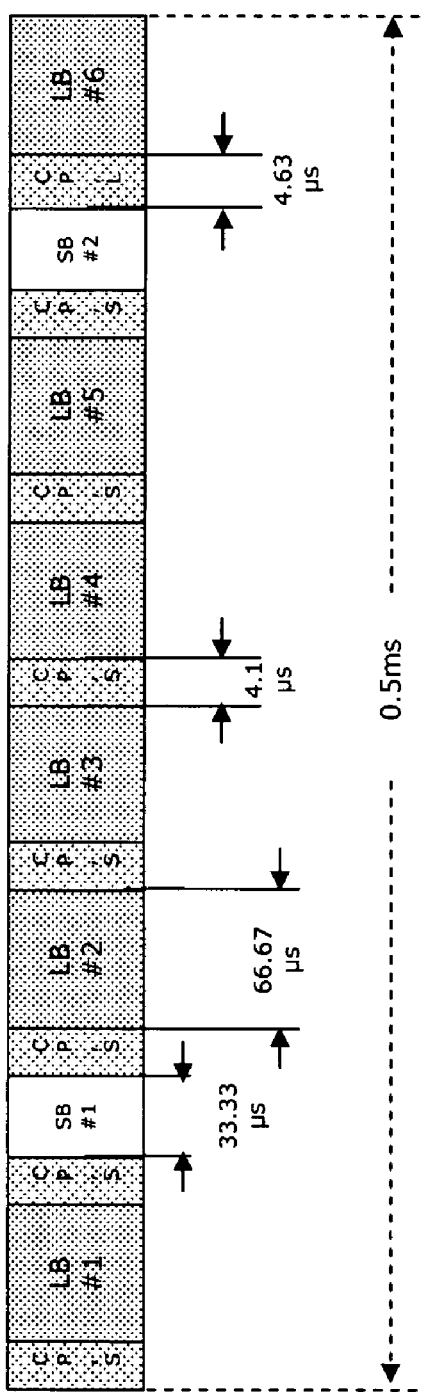
FIG. 3 illustrates an exemplary TDD uplink subframe formatted according to the 3G LTE standard.

FIG. 3 illustrates an exemplary TDD uplink subframe formatted according to the 3G LTE standard. The uplink subframe has a 0.5 ms duration and consists of 6 long symbols and 2 short symbols. One of the 6 long symbols has a longer cyclic prefix and is normally located at the end of the subframe. The last symbol of the last subframe of uplink frame are considered Idle period, which provides a similar function to the RTG of the WiMAX frames.

In accordance with one exemplary embodiment of the present invention the sleep mode of operation is employed to time-interlace WiMAX and 3G LTE frames. Sleep mode is typically provided to save mobile station battery power, and allows the mobile station to power down some or all components for a pre-negotiated period of time known as an unavailability interval. During the unavailability interval the network will not transmit information to the mobile station, but instead will store any information for the mobile station's next availability interval. Sleep mode is typically employed such that during any particular period of time some mobile stations are in an availability interval and other mobile stations are in an unavailability interval.

Figure 6:
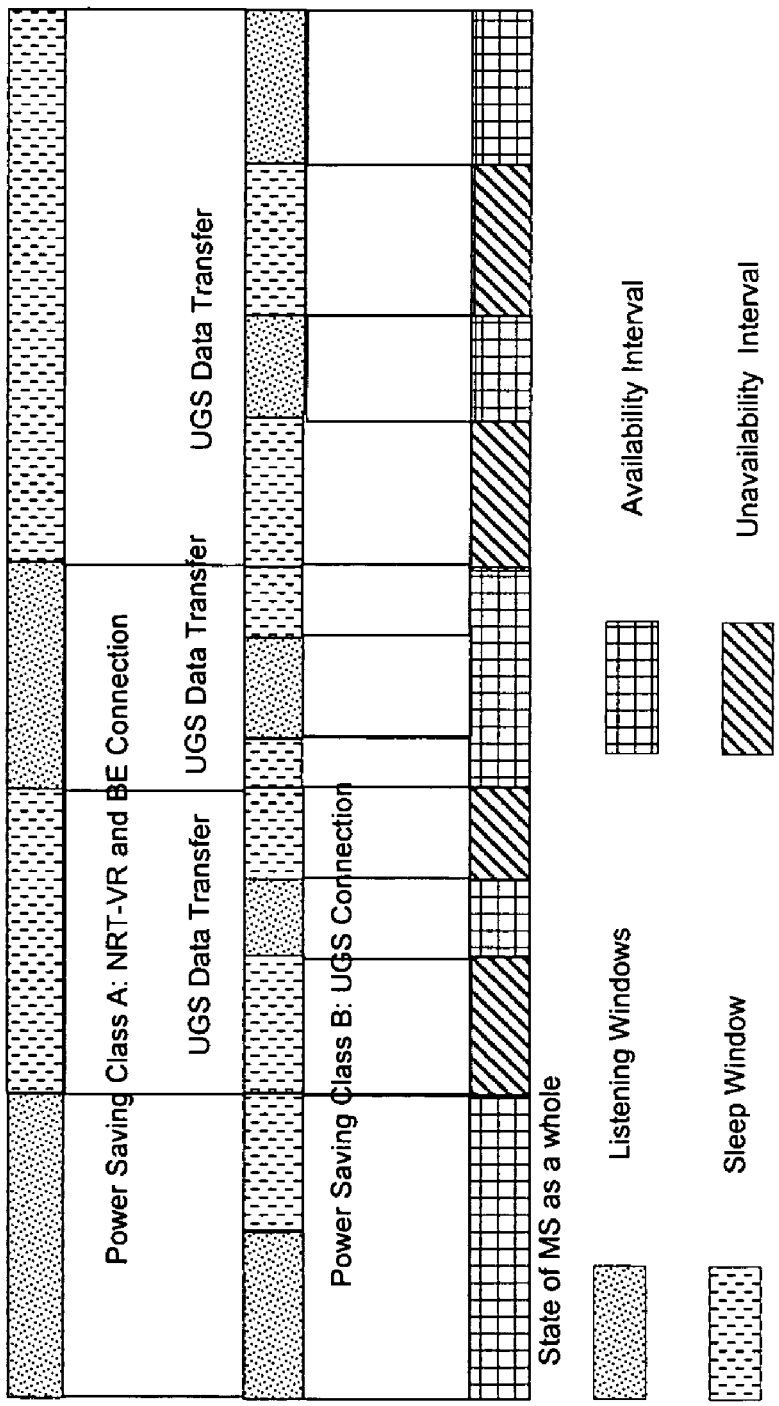
FIG. 6 illustrates availability and unavailability intervals of a sleep mode according to the WiMAX standard.

WiMAX provides a number of Power Saving Classes, which group connections having common demand properties. For example, all Best Effort and NRT-VR (Non-Real Time, Variable Rate) connections may be marked as belonging to a single class, while two UGS (Unsolicited Grant Service) connections may belong to two different classes in case they have different intervals between subsequent allocations. Power Saving Classes may be repeatedly activated and deactivated. Activation of certain Power Saving Class starts availability and unavailability interval sequences associated with this class. FIG. 6 illustrates availability and unavailability intervals of a mobile user in sleep mode and its association with the power classes initiated by that mobile according to the WiMAX standard.

Figure 4:
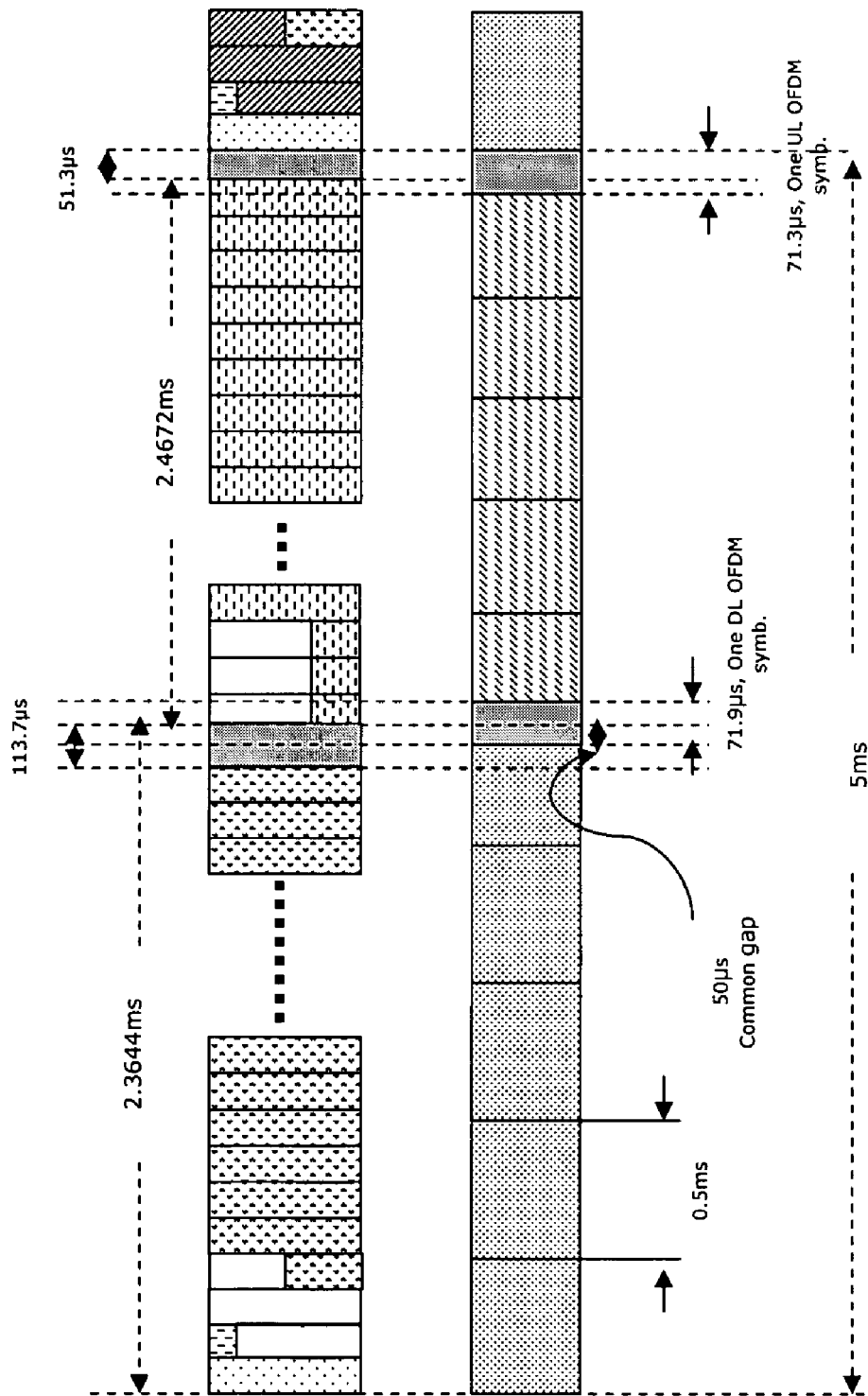
FIG. 4 illustrates exemplary WiMAX-formatted and 3G LTE-formatted frames aligned in accordance with the present invention.

FIG. 4 illustrates exemplary WiMAX-formatted and 3G LTE-formatted frames aligned in accordance with one embodiment of the present invention. In order to allow WiMAX and 3G LTE operate on adjacent carriers in the same cell or in the same carrier on two adjacent cells (i.e., cells in which downlink transmission from one base station can interfere with uplink transmissions to the other base station), the frames of the WiMAX and 3G LTE technologies are aligned to prevent the WiMAX downlink transmission from colliding with the 3G LTE uplink transmissions, and vice versa. This alignment is achieved by using the idle periods to prevent downlink transmissions of one technology from causing interference with uplink transmissions of the other technology. The overlap of idle periods of these two technologies is maximized to avoid any performance degradation. FIG. 4 depicts an example where downlink/uplink ratio is 1:1, although the present invention is equally applicable to other ratios. For WiMAX wireless communication technology the size of TTG and RTG will depend on the downlink/uplink ratio. These values should be greater than the SSTTG (device switching time) plus the round trip delay and their sum should be 168.4 μs.

As is clear from FIG. 4, the interference impact between downlink transmissions of one technology is minimized with respect to uplink transmissions of the other technology, without unnecessarily increasing the size of gaps due to this alignment. As a result, there is no performance degradation. Although FIG. 4 illustrates the use of the upper subframe structure of FIG. 2 (i.e., using 7 short symbols), the present invention can also employ the lower frame structure (i.e., using 6 long symbols).

In some cases, the downlink/uplink ratio may not allow for this frame alignment, such as 6:4 and 4:6 ratios where 3 symbols are employed for the WiMAX uplink. To overcome this problem, the 6 long symbol subframe structure for 3G LTE can be employed or a different permutation can be employed in the WiMAX uplink, such as a combination of AMC and PUSC, to relax the limitation on the number of WiMAX uplink symbols.

Figure 5:
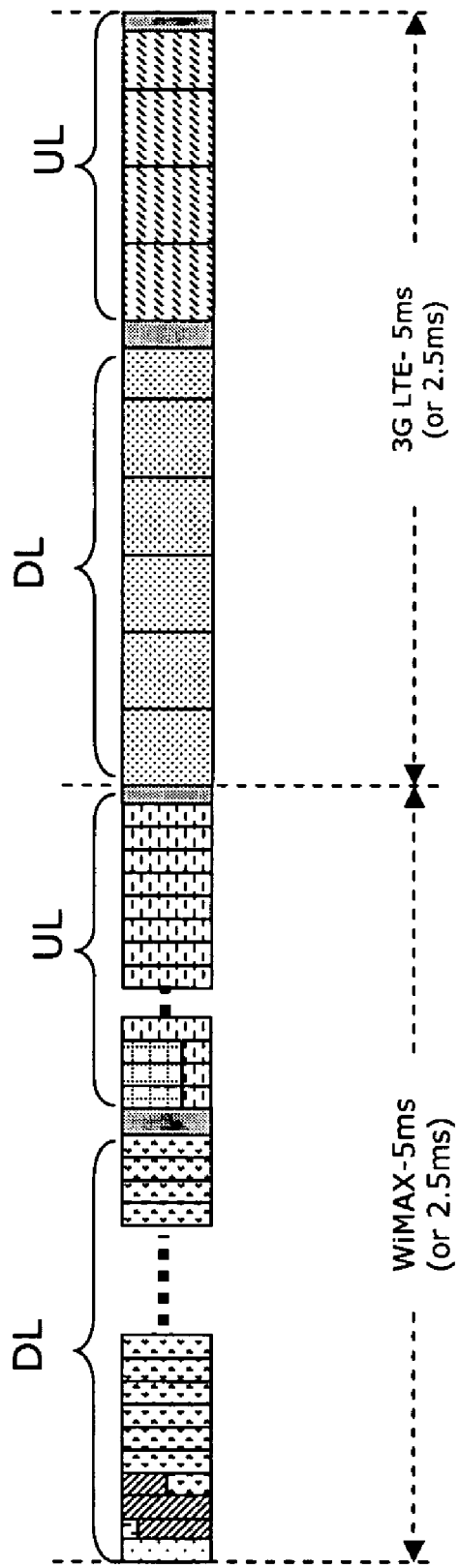
FIG. 5 illustrates exemplary WiMAX-formatted and 3G LTE-formatted frames aligned by time-interlacing frames in accordance with the present invention.

FIG. 5 illustrates exemplary WiMAX-formatted and 3G LTE-formatted frames aligned by time-interlacing frames in accordance with one exemplary embodiment of the present invention. This time-interlacing of frames can be employed where a wireless network operator's spectrum availability is tight, and therefore it is not possible to allocate separate carriers to 3G LTE and WiMAX. In rural areas the demand for high capacity is typically lower than urban areas. In this case one RF carrier could be shared between both technologies, and due to lightly loaded cells, the network can tolerate the throughput inefficiency that results from this configuration. The advantage of this embodiment is that the capital expenditure gain that results from using a single RF carrier.

As illustrated in FIG. 1, the smallest time component for WiMAX access technology is a frame, which is composed of several OFDM symbols. WiMAX has a continuous frame structure, and accordingly, it is not allowed to interrupt one WiMAX TDD frame. WiMAX allows different frame sizes starting from 2.5 ms up to 20 ms, however, the selected frame size for the first release of WiMAX profile is 5 ms. As a result, the only way that WiMAX could share a carrier with another TDD technology is to interlace the frames (time-interlacing of frames). The time-interlacing of the present invention reduces any necessary changes to implement two TDD technologies operating on the same carrier in the same cell. Although the time-interlacing technique of the present invention may cause degradation in the performance of both technologies, it is particularly appropriate when spectrum availability is tight, and there is not a need for high capacity (e.g., certain rural areas). If a decrease in delay is desired, 2.5 ms frames can be employed for each wireless communication technology.

In order to allow time-interlacing of frames, each technology must incorporate appropriate signaling to allow some frames to be skipped by each mobile. Since the time granularity of 3G LTE is the 0.5 ms subframe, if 3G LTE allows skipping of some subframes, the same functionalities can be used to allow time-interlacing with WiMAX. As long as 3G LTE allows the mobile station to be inactive for some time window (either in downlink or uplink), the type of access technology used in that window should be transparent to the 3G LTE mobile station.

In accordance with exemplary embodiments of the present invention, time-interlacing of frames in WiMAX can be provided by using the sleep mode. All mobile stations communicating using one technology will have at least some overlap of unavailability intervals, which are mutually exclusive to availability intervals of the other technology. Specifically, as illustrated in FIG. 5, during the first time interval all mobile stations operating according to 3G LTE will operate as if they are in an unavailability interval, and during the second time interval all mobile stations operating according to WiMAX will operate as if they are in an unavailability interval. Each technology can still employ conventional sleep modes in conjunction with the present invention. For example, during the first time interval some mobile stations operating according to WiMAX can still operate as if they are in an unavailability interval, and similarly, in the second time interval some mobile stations operating according to 3G LTE can still operate as if they are in an unavailability interval.

In accordance with exemplary embodiments of the present invention, there are three ways that a WiMAX base station can control mobile stations to skip certain number of frames periodically to allow 3G LTE operation, all of which incur almost no signaling overhead on WiMAX. In the first option an extended subheader group is used immediately after the generic MAC header and before all subheaders. The extended subheader group starts with a length field that is followed by one or multiple extended subheaders. Each extended subheader consists of a reserved bit, a 7-bit extended subheader type field, and a variable size extended subheader body. One of the downlink extended subheader types is the downlink sleep control extended subheader sent by the base station to activate/deactivate certain Power Saving Class. The requested operation is effective from the next frame after the one where the message was transmitted. If the unavailability interval is activated for all power saving classes, the mobile will not listen to the traffic for the specified number of frames.

If the unavailability interval is set and will not change very frequently, the RNG-RSP (Ranging Response) message from the base station could be used. This is the second solution to skip frames in WiMAX. Ranging is a process where the link quality, distance adjustment, and time and frequency synchronization between the mobile station and the base station is performed. The ranging could be performed at the time of mobile station registration (initial ranging), as well as periodically during the session (periodic ranging). A ranging request message (RNG-REQ) is sent by the mobile station, and ranging response (RBG-RSP) is transmitted by the base station. One of the parameters included in RNG-RSP message by the base station could be "Power_Saving_Class_Parameters", which is a Compound TLV (Type-Length Variable Messages) to specify Power Saving Class operation, and is used to activate or deactivate Power Saving Classes. This mode can be used only if the service flows communicated by mobile stations are UGS (Unsolicited Grant Service), RT-VR (Real Time Variable Rate), or multicast services, and cannot be used for Best Effort or Non-Real Time Variable Rate traffic.

The third option employs the MOB_SLP_RSP (Mobile Sleep Response) message. This message can be sent from base station to a mobile station on Broadcast CID or on the mobile station basic CID in response to an MOB_SLP_REQ (mobile Sleep Request) message, or may be sent unsolicited. This message could either define new power classes, or refer to existing power classes, and can command the mobile station to put all connection IDs into an unavailability interval of the sleep mode of operation. The duration of availability and unavailability intervals are defined in this message, and therefore no significant signaling overhead is introduced.

In all three options mentioned above, the messages only need to sent once in order to define the format of time-interlacing of frames between WiMAX and 3G LTE, and only needs to be resent when the format changes.

Because most of control information in WiMAX technology access is sent in downlink and uplink MAP, the number of skipped frames should not be too large. Moreover, the time synchronization and coarse channel estimation is performed by the preamble symbol. If these messages are not received by the mobile stations for several frames, they might loose synchronization and fail to receive valuable control information contained in DL/UL MAP.

Baseband processing for the base stations of each access technology can be performed using an application specific integrated circuit (ASIC) or field programmable gate array (FPGA) modules, or a microprocessor. When an ASIC module is used, extra base station cards are employed, while with FPGA modules or microprocessors only need updated software. However, due to similarities between WiMAX and 3G LTE baseband (both OFDM-based), the fundamental physical layer parameters that drive the hardware architecture and processing power requirements are similar for WiMAX and LTE to allow for an implementation on common hardware.

The present invention can be applied to a mixture of WiMAX-only and 3G LTE-only mobile stations and/or could also be applied to dual mode devices supporting both 3G LTE and WiMAX. In the latter case, due to differences in sampling clock frequency between WiMAX and 3G LTE, either a base clock along with variable rate controller should be used in each mobile station, or two local oscillators are needed.

FIG. 7 illustrates an exemplary method for supporting multiple wireless communication technologies operating in the same cell on different carriers or in different cells on the same carrier in accordance with the present invention. This method is generic to the first and second scenarios described above. Initially, a wireless network operator deploys a first base station that operates according to a first TDD wireless communication technology, WiMAX, and a second base station that operates according to a second TDD wireless communication technology, 3G LTE (steps 710 and 720). These base stations can be located in separate cells or they can be co-located in the same cell. The base stations can be deployed at the same time, or the deployment can be delayed, if desired. Additionally, if the first and second base stations are co-located in the same cell, then they can be incorporated into a single base station (e.g., operating using separate base station cards but using common radio frequency components).

After the first and second base stations are deployed, the number of OFDM symbols for WiMAX downlink and uplink subframes are selected according to the particular downlink/uplink ratio (step 730), and the number of 3G LTE subframes (each 0.5 ms) for the downlink and uplink portions are selected (step 740).

Portions of the 3G LTE and WiMAX frames are selected for idle periods (step 750). For 3G LTE, one or two symbols of the last subframe in the downlink portion are selected as the idle period. The choice of one or two symbols is made after choosing the TTG and RTG for WiMAX such that they are greater than the SSTTG plus the round trip delay and their sum is 168.4 μs. The idle periods for 3G LTE is the smallest number of OFDM symbols that causes no conflict between the WiMAX downlink and 3G LTE uplink portion, as well as no conflict between WiMAX uplink and 3G LTE downlink. During these idle periods traffic will not be transmitted by the base station or mobile station associated with the idle period. The first and second base stations are controlled in such a way that the idle periods of these base stations overlap. In other words, downlink traffic of one base station will not interfere with or collide with uplink traffic of the other base station.

FIG. 8 illustrates an exemplary method for supporting multiple wireless communication technologies operating in the same cell on the same carrier in accordance with the present invention. This method is applied to the third scenario described above. Initially, a wireless network operator deploys a first base station that operates according to a first TDD wireless communication technology, WiMAX, and a second base station that operates according to a second TDD wireless communication technology, 3G LTE (steps 810 and 820). These base stations are co-located in the same cell, and are operating in the same carrier frequencies. The base stations can be deployed at the same time, or the deployment can be delayed, if desired. Additionally, if the first and second base stations are co-located in the same cell, then they can be incorporated into a single base station (e.g., operating using separate base station cards but using common radio frequency components). The use of a single base station in this case allows for sharing of common components, including diplexers, antennas, processors and the like.

After the first and second base stations are deployed, the number of radio frames that WiMAX base station transmits and receives and the WiMAX mobile stations transmit and receive is determined (step 830). The same determination is performed for the 3G LTE base station and mobile stations (step 840).

The WiMAX mobile stations are notified by the WiMAX base station of the availability and unavailability intervals and the 3G LTE base station notifies the 3G LTE mobile stations of the availability and unavailability intervals (step 850). This causes the WiMAX and 3G LTE mobile stations to operate in a sleep mode with particular periods of time for availability intervals and other periods of time for unavailability intervals. For WiMAX mobile stations this notification could happen by one of the three methods described above, i.e., using extended subheaders, using RNG_RSP, and using MOB_SLP_RSP messages. The first and second base stations are controlled in such a way that the frames of one base station are time-interlaced with the frames of the other base station.

Although not illustrated, the number of frames each technology goes to sleep mode is adaptive, and could be modified by sending new control signaling both for WiMAX and 3G LTE.

Exemplary embodiments of the present invention have been described in connection with WiMAX and 3G LTE TDD technologies. It should be recognized, however, that the present invention is equally applicable to any other TDD technologies in which one or a multiple of time frames of one technology fit into one or multiple time frames of the other technology and each have a sufficient idle period or gap between uplink and downlink transmissions. Although exemplary embodiments have been described in connection with base stations communicating with mobile stations, the present invention can also be employed with base stations that communicate with fixed stations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a wireless communication system, the method comprising the acts of:

deploying a first base station that operates according to a first time division duplexing (TDD) wireless communication technology;

deploying a second base station that operates according to a second TDD wireless communication technology, wherein the first and second base stations operate in a same cell on a same carrier frequency;

selecting a first time period for a frame of the first base station that includes a downlink subframe and an uplink subframe;

selecting a second time period for a frame of the second base station that includes a plurality of downlink subframes and a plurality of uplink subframes;

notifying mobile stations supported by the first base station of the first time period, wherein the act of notifying mobile stations supported by the first base station of the first time period comprises the act of sending a notification in an extended subheader;

notifying mobile stations supported by the second base station of the second time period; and controlling communications of the first and second base stations in such a way that the first and second time periods are time-interlaced, wherein mobile stations communicating with the first and second base stations operate in a sleep mode in such a way that an availability interval for mobile stations supported by the first base station is an unavailability interval for mobile stations supported by the second base station, wherein the first time period is an unavailability interval for the mobile stations supported by the second base station and the second time period is an unavailability interval for the mobile stations supported by the first base station.

2. The method of claim 1, wherein the first and second base stations are a single base station.

3. The method of claim 1, wherein the first and second wireless communication technology employ orthogonal frequency division modulation.

4. The method of claim 1, wherein the first base station operates according to WiMAX wireless communication technology and the second base station operates according to 3G Long Term Evolution (LTE) wireless communication technology.

5. A method for operating a wireless communication system, the method comprising the acts of:

deploying a first base station that operates according to a first time division duplexing (TDD) wireless communication technology;

deploying a second base station that operates according to a second TDD wireless communication technology, wherein the first and second base stations operate in a same cell on a same carrier frequency;

selecting a first time period for a frame of the first base station that includes a downlink subframe and an uplink subframe;

selecting a second time period for a frame of the second base station that includes a plurality of downlink subframes and a plurality of uplink subframes;

notifying mobile stations supported by the first base station of the first time period, wherein the act of notifying mobile stations supported by the first base station of the first time period comprises the act of sending a notification in a ranging response message;

notifying mobile stations supported by the second base station of the second time period; and controlling communications of the first and second base stations in such a way that the first and second time periods are time-interlaced, wherein mobile stations communicating with the first and second base stations operate in a sleep mode in such a way that an availability interval for mobile stations supported by the first base station is an unavailability interval for mobile stations supported by the second base station, wherein the first time period is an unavailability interval for the mobile stations supported by the second base station and the second time period is an unavailability interval for the mobile stations supported by the first base station.

6. The method of claim 5, wherein the first and second base stations are a single base station.

7. The method of claim 5, wherein the first and second wireless communication technology employ orthogonal frequency division modulation.

8. The method of claim 5, wherein the first base station operates according to WiMAX wireless communication technology and the second base station operates according to 3G Long Term Evolution (LTE) wireless communication technology.

9. A method for operating a wireless communication system, the method comprising the acts of:

deploying a first base station that operates according to a first time division duplexing (TDD) wireless communication technology;

deploying a second base station that operates according to a second TDD wireless communication technology, wherein the first and second base stations operate in a same cell on a same carrier frequency;

selecting a first time period for a frame of the first base station that includes a downlink subframe and an uplink subframe;

selecting a second time period for a frame of the second base station that includes a plurality of downlink subframes and a plurality of uplink subframes;

notifying mobile stations supported by the first base station of the first time period, wherein the act of notifying mobile stations supported by the first base station of the first time period comprises the act of sending a notification in a mobile sleep response message;

notifying mobile stations supported by the second base station of the second time period; and controlling communications of the first and second base stations in such a way that the first and second time periods are time-interlaced, wherein mobile stations communicating with the first and second base stations operate in a sleep mode in such a way that an availability interval for mobile stations supported by the first base station is an unavailability interval for mobile stations supported by the second base station, wherein the first time period is an unavailability interval for the mobile stations supported by the second base station and the second time period is an unavailability interval for the mobile stations supported by the first base station.

10. The method of claim 9, wherein the first and second base stations are a single base station.

11. The method of claim 9, wherein the first and second wireless communication technology employ orthogonal frequency division modulation.

12. The method of claim 9, wherein the first base station operates according to WiMAX wireless communication technology and the second base station operates according to 3G Long Term Evolution (LTE) wireless communication technology.

* * * * *